US010173500B2

(12) United States Patent
Ding (10) Patent No.: US 10,173,500 B2
(45) Date of Patent: Jan. 8, 2019

(54) ANTI-GLARE DEVICE AND METHOD FOR AUTOMOBILES

(71) Applicant: Tianhao Ding, Lexington, MA (US)

(72) Inventor: Tianhao Ding, Lexington, MA (US)

( * ) Notice: Subject to any disclaimer, the term of this patent is extended or adjusted under 35 U.S.C. 154(b) by 0 days.

(21) Appl. No.: 15/603,850

(22) Filed: May 24, 2017

(65) Prior Publication Data

US 2018/0229589 A1    Aug. 16, 2018

Related U.S. Application Data

(60) Provisional application No. 62/457,876, filed on Feb. 11, 2017.

(51) Int. Cl.
B60J 3/02 (2006.01)

(52) U.S. Cl.
CPC .......... B60J 3/0234 (2013.01); B60J 3/0208 (2013.01); B60J 3/0291 (2013.01)

(58) Field of Classification Search
CPC ....... B60J 3/0234; B60J 3/0291; B60J 3/0208
USPC .......................... 296/97.6, 97.2, 97.4, 97.11
See application file for complete search history.

(56) References Cited

U.S. PATENT DOCUMENTS

| 2,833,591 | A | * | 5/1958 | Kurtzke | ................. | B60J 3/0208 |
| | | | | | | 160/211 |
| 5,611,591 | A | * | 3/1997 | Van Devender | ....... | B60J 3/0208 |
| | | | | | | 296/97.6 |
| 6,402,221 | B1 | | 6/2002 | Ogunjobi | | |
| 7,891,722 | B2 | * | 2/2011 | Phillips | ................. | B60J 3/0204 |
| | | | | | | 296/97.11 |
| 9,150,082 | B2 | | 10/2015 | Aryeh | | |
| 2005/0161481 | A1 | * | 7/2005 | Rumberger | ............. | B60R 7/088 |
| | | | | | | 224/311 |

(Continued)

FOREIGN PATENT DOCUMENTS

| DE | 1904033 | * | 8/1970 |
| DE | 3008047 | * | 9/1981 |

OTHER PUBLICATIONS

Easy View HD Sun Glare Blocker Visor Car Auto Flip Fold Down Clip On seen TV, ebay.com advertisement. Accessed before Mar. 13, 2017. Four pages.

(Continued)

*Primary Examiner* — Dennis H Pedder
(74) *Attorney, Agent, or Firm* — Joe Zheng (57) ABSTRACT

An anti-glare device for reducing night-time road glare includes an anti-glare panel for attenuating and/or filtering light traveling from a source of glare through the panel to a driver's eyes. The anti-glare panel is secured to a sun visor of an automobile via an attachment mechanism comprising an elastic member, which compresses around the sun visor. The anti-glare panel attaches to the elastic member via attachment arms of the anti-glare panel that are folded over and secured, forming loops through which the elastic member is threaded. The attachment mechanism can further comprise a secondary elastic member for holding the anti-glare panel in an inactive position when the device is not being used. Additionally, the horizontal width of the anti-glare panel can decrease over the panel's vertical length, forming a recess at the panel's bottom corner for allowing natural visibility of a center line and/or lane markings of the road.

14 Claims, 8 Drawing Sheets

(56) References Cited

U.S. PATENT DOCUMENTS

2010/0283284 A1* 11/2010 Brule .................... B60J 3/0208
  296/97.6
2015/0115645 A1* 4/2015 Aryeh ................... B60J 3/0278
  296/97.3

OTHER PUBLICATIONS

Easy View XT As Seen on TV Flip Down HD Sun Glare Diffuser Visor New in Box, ebay.com advertisement. Accessed before Mar. 13, 2017. Five pages.
HD Car Anti Glare Dazzling Goggle Day and Night Vision Mirror Sun Visors Clear View Dazzling Glass Goggles, iunsun, Amazon.com advertisement. Accessed before Mar. 13, 2017. Six pages.
Idea Village HD Vision Visor The Date & Night Visor for Your Car, Amazon.com advertisement. Accessed before Mar. 13, 2017. Seven pages.

* cited by examiner

ANTI-GLARE DEVICE AND METHOD FOR AUTOMOBILES

RELATED APPLICATIONS

This application claims the benefit under 35 USC 119(e) of U.S. Provisional Application No. 62/457,876, filed on Feb. 11, 2017, which is incorporated herein by reference in its entirety.

BACKGROUND OF THE INVENTION

Glare, from sources such as direct sunlight and reflections of sunlight during the day, and bright headlights at night, can negatively affect visibility for drivers of automobiles.

Several anti-glare devices have been implemented to block or reduce glare. Typically, existing anti-glare devices attach to a sun visor of the automobile using hooks or clips and comprise anti-glare panels, which are panels of either tinted, translucent or opaque material for filtering, selectively blocking, or entirely blocking light from reaching the eyes of the driver, thus reducing glare.

SUMMARY OF THE INVENTION

Existing anti-glare devices include parts that are rigid, such as anti-glare panels that are thick and inflexible, and attachment mechanisms such as hinges, telescoping arms, hooks and clips. These rigid parts are a safety hazard in the event of an accident. Additionally, the complex attachment mechanisms make the devices difficult and expensive to manufacture, and install.

In addition, many of these devices are marketed for both daytime and nighttime glare. However, the nature of daytime glare and nighttime glare are quite different. For example, the sunlight results in glare that is either uniformly distributed in parallel beams or reflected from varied, unpredictably distributed sources (such as car windows, building windows, street signs, bodies of water, etc.). Additionally, during the day, the entire field of vision of the driver is illuminated, and there are thus no negative consequences to filtering or blocking as much light as is necessary to reduce the daytime glare. As a result, devices that are best suited to reducing the daytime glare include sunglasses and anti-glare panels that are as large as possible. The nighttime glare, on the other hand, usually takes the form of predictably distributed spots of glare (for example, headlights from oncoming traffic) while the rest of the driver's field of vision is relatively dark. Thus, devices that are best suited to reducing the nighttime glare include anti-glare panels that are as small as possible.

There is a need for specialized anti-glare devices with small anti-glare panels for nighttime driving.

At night, the glare from approaching headlights can severely obstruct a driver's vision. It can take a few seconds for the driver to adjust his/her vision to respond to the oncoming traffic. This is discomforting and distracting to drivers and could lead to automobile accidents.

This invention relates to an anti-glare device that reduces the headlight glare from approaching automobiles, specifically at night. The device includes an anti-glare panel, comprising a thin strip of tinted material, which is installed on an automobile's sun visor using a simple attachment mechanism comprising an elastic member. With the help of the anti-glare panel, automobile drivers can view the road and surroundings more comfortably when automobiles are approaching, for example, with their high-beam headlights on. The anti-glare device can be adjusted with the sun visor to allow its best antiglare effect. The anti-glare device is designed to be very concise in its size so that drivers can maintain maximum natural vision of the external scene and to maximize the safety of the driver in the event of an accident or sudden stop. Additionally, the anti-glare device is easy to install and made of light and flexible parts that are relatively easy and inexpensive to manufacture.

In general, according to one aspect, the invention features a device for reducing night time road glare in an automobile. The device comprises an anti-glare panel, which is a sheet of flexible, tinted material for filtering incoming light, and an attachment mechanism, which attaches the anti-glare panel to a sun visor of the automobile.

In one embodiment, the anti-glare panel has a horizontal length of about 50 to 300 millimeters (mm). A current embodiment is about 115 mm.

The panel has a vertical width of about 20 to 100 mm. A current embodiment is about 40 mm.

The panel is preferably made from a flexible plastic film. Currently, the panel is about 5 (0.13 mm) to 7 mil (0.18 mm) thick, to as thick as about 10 mils (0.25 mm) or more.

The attachment mechanism is an elastic member. The anti-glare panel connects to the elastic member via attachment arms of the anti-glare panel that are folded over and secured, forming loops through which the elastic member is threaded. In this way, the panel can easily slide on the string, allowing the driver to adjust its lateral position.

The ends of the elastic member either are joined together to form a ring or loop that compresses around the sun visor to secure the device in place, or attach to U-shaped clips, which attach to either side of the sun visor.

The attachment mechanism can further comprise an additional elastic member for holding the anti-glare panel in an inactive position (lying flat against the sun visor) when the device is not being used.

Additionally, the horizontal length of the anti-glare panel can decrease over the panel's vertical width, forming a recess at the panel's bottom corner for allowing natural visibility of a center line and/or lane markings of the road. Preferably, the anti-glare panel is made of polyvinyl chloride (PVC) or polyethylene terephthalate (PET) and is tinted with an amber color.

In general, according to another aspect, the invention features a method for reducing night time road glare in an automobile. An anti-glare device is attached to a sun visor via an attachment mechanism, and an anti-glare panel of the device is located into a sightline to oncoming headlights to filter light. The anti-glare panel is a sheet of flexible, tinted, transparent material.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
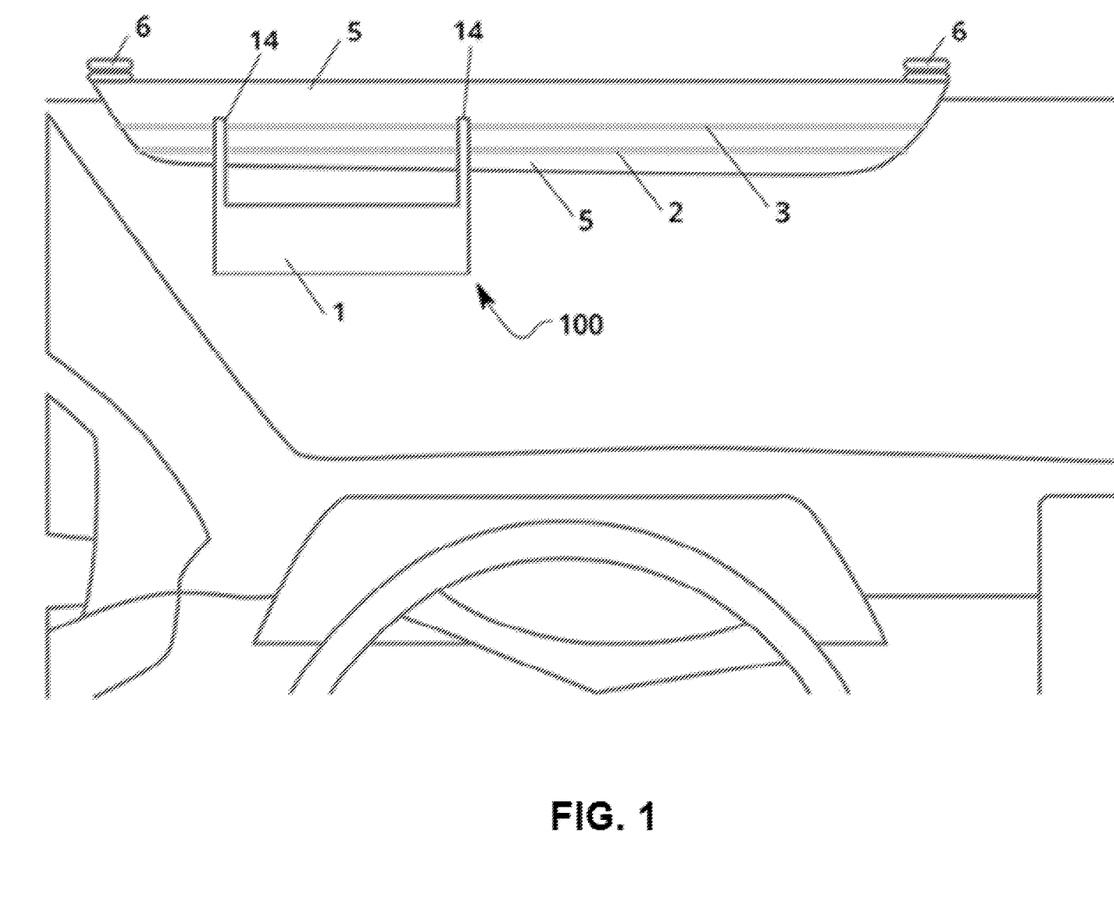
FIG. 1 is a perspective view from the perspective of a driver of a car illustrating a first embodiment of an anti-glare device installed on a car's driver-side sun visor, according to the present invention.

FIG. 1 shows the first embodiment of an device 100 according to the present invention.

Here, the anti-glare device 100 is installed on a sun visor 5 of an automobile. In a typical automobile, the sun visor 5 is attached to the ceiling of the automobile via one or more visor attachment mechanisms 6, which typically comprise hinges and/or clips for tilting the sun visor 5 forward, backward, left and/or right. In the illustrated example, the visor attachment mechanisms 6 attach to the top edge of the sun visor 5.

In the illustrated example, the anti-glare device 100 includes an anti-glare panel 1, which is a strip of tinted, transparent film, and an attachment mechanism comprising a primary elastic member 3 (e.g., an elastic string or an elastic band) and a secondary elastic member 2. In general, the attachment mechanism secures the anti-glare panel 1 to the sun visor 5, and the anti-glare panel 1 reduces the glare by attenuating and/or filtering the light traveling from the source of glare through the anti-glare panel 1 to the eyes of the driver.

In the preferred embodiment, the anti-glare panel 1 has a horizontal length of about 50 to 300 millimeters (mm). A current embodiment is about 115 mm, which is slightly wider than the distance between an average person's eyes, which allows the anti-glare panel 1 to shield both eyes if necessary.

The panel has a vertical width of about 20 to 100 mm. A current embodiment is about 40 mm, which is sufficient to contain multiple approaching automobiles' headlights in its frame. Because of the compact dimensions of the anti-glare panel 1, the driver can flexibly look at oncoming objects on the road with the anti-glare panel 1 out of their sightline.

In the preferred embodiment, the anti-glare panel 1 is made from thin, and thus flexible, plastic film such as polyvinyl chloride (PVC) or polyethylene terephthalate (PET) and has a thickness of 5 (0.13 mm) to 7 mil (0.18 mm) thick, to as thick as about 10 mils (0.25 mm) or more, which provides for a balance of durability and sufficient lightness and flexibility such that the anti-glare panel 1 does not present a safety hazard in the event of an accident or sudden stop of the automobile.

Additionally, in the preferred embodiment, the anti-glare panel 1 is tinted an amber color, which provides a balance between reducing the intensity of light traveling through the anti-glare panel 1 and minimizing how much the anti-glare panel 1 darkens the rest of the surroundings viewed through the panel.

In the illustrated embodiment, the anti-glare panel 1 further comprises two attachment arms 14, which are long strips of material, typically plastic, for securing the anti-glare panel 1 to the primary elastic member 3. The attachment arms 14 can be the same material as the anti-glare panel 1 or a different material. Additionally, in an alternative embodiment (not illustrated), the attachment arms 14 can be integral with the anti-glare panel 1. Both ends of the first and second attachment arms 14 are secured to the top left and top right corners of the anti-glare panel 1, forming loops through which the primary elastic member 3 is threaded.

Further, the loops preferably slide on the primary elastic member 3 to allow easy lateral adjustment of the position of the panel so that during operation the panel can be adjusted by the driver into their sightline to oncoming headlights.

In the illustrated embodiment, the ends of the primary elastic member 3 are joined together (for example, in a knot), forming an elastic ring that is stretched and then compresses around the sun visor 5, securing the anti-glare panel 1 in place. The elasticity of the primary elastic member 3 allows the anti-glare device 100 to be easily installed on the sun visors 5 of varying sizes and shapes. The anti-glare device 100 can be installed anywhere along the vertical length of the sun visor 5 from the top edge to the bottom edge by allowing the primary elastic member 3 to compress around the sun visor 5 in whatever position along the left and right edges of the sun visor 5 is desired.

The anti-glare panel 1 can also be positioned anywhere along the lateral length of the sun visor 5, from the left edge to the right edge, by moving the anti-glare panel 1 left or right along the primary elastic member 1 via the loops formed by the two attachment arms 14. Additionally, by adjusting the sun visor 5 up, down, forward, and/or backward, the anti-glare panel 1 can be further positioned to achieve its optimal use.

The anti-glare device 100 can be easily uninstalled by stretching the primary and secondary elastic members 3, 2 and removing them from the sun visor 5.

In this way, the same anti-glare device 100 can be used in different automobiles and in different positions within the same automobile (including on either the driver or passenger side), can be relocated from one automobile to another, and can be used both in countries where oncoming traffic is on the left side of the road, as well as those where oncoming traffic is on the right side of the road, all with minimal installation effort.

In the illustrated example, the anti-glare panel 1 hangs in an active position, roughly perpendicular to the sun visor 5, and located between the driver's eyes and sources of glare on the road, specifically, into a sightline to oncoming headlights. On the other hand, the secondary elastic member 2, which is also stretched around the sun visor 5, can be used to secure the anti-glare panel 1 flat against the sun visor 5 in an inactive position when the anti-glare device 100 is not being used.

Figure 2:
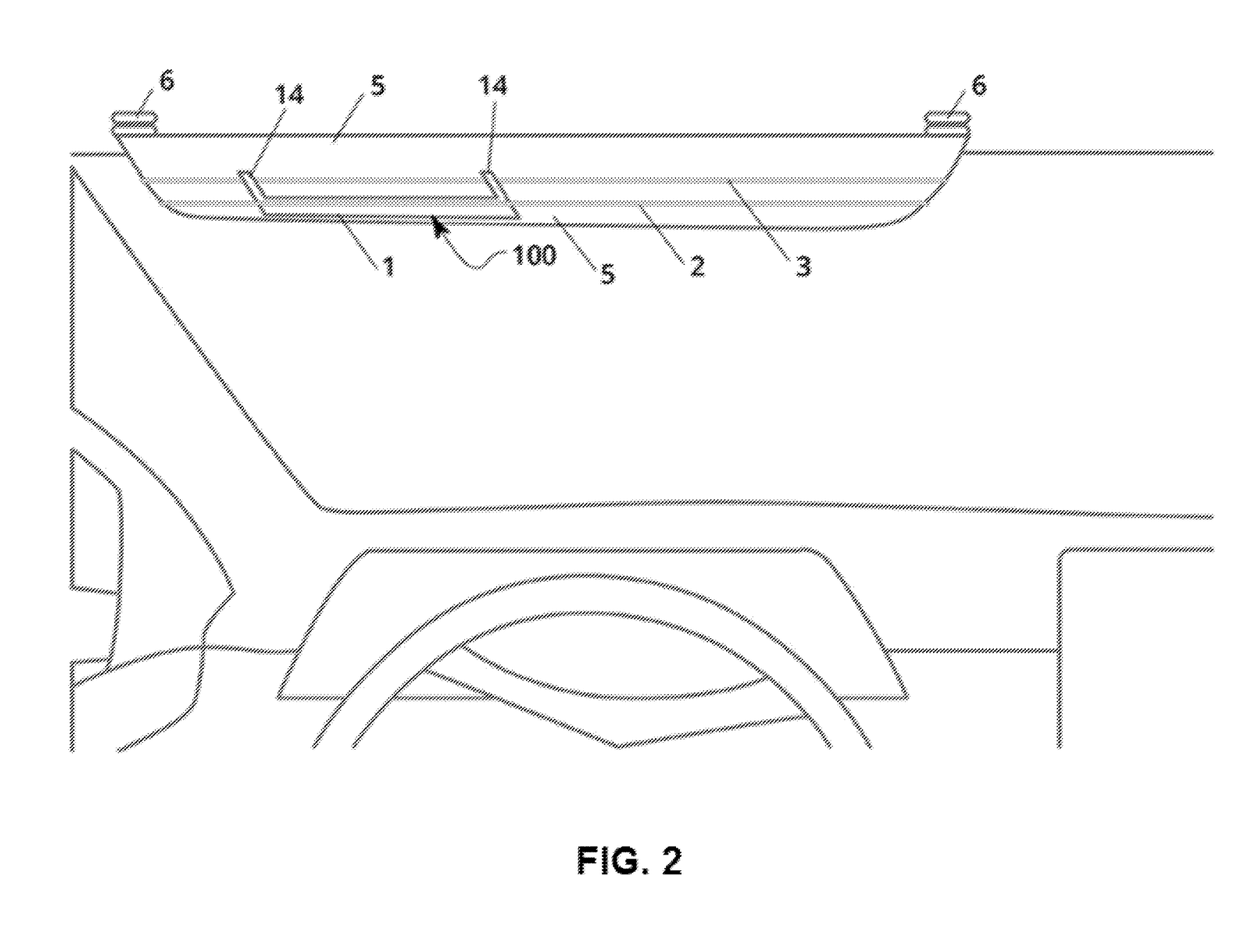
FIG. 2 is a perspective view illustrating the first embodiment of the anti-glare device, wherein an anti-glare panel is secured in an inactive position by a secondary elastic member.

FIG. 2 illustrates an example of the first embodiment of the anti-glare device 100, wherein the anti-glare panel 1 is secured in an inactive position by the secondary elastic member 2.

Figure 3:
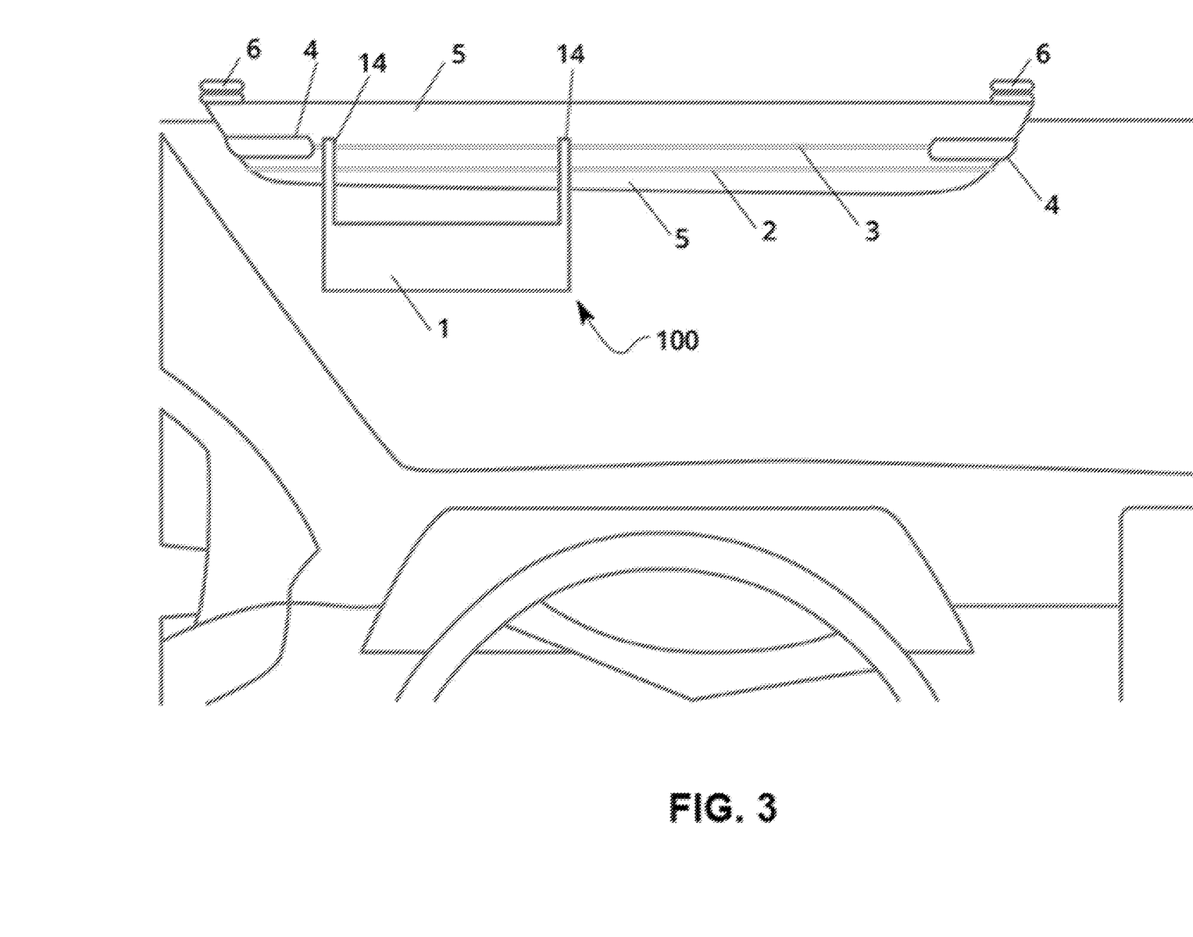
FIG. 3 is a perspective view illustrating a second embodiment of the anti-glare device, wherein the attachment mechanism comprises two U-shaped clips for holding the elastic member.

FIG. 3 illustrates an example of a second embodiment of the anti-glare device 100. In this example, the attachment mechanism further comprises two U-shaped clips 4. Instead of joining together to form a ring, each end of the primary elastic member 3 attaches to one of the U-shaped clips 4. The U-shaped clips then attach to the left and right side edges of the sun visor 5, securing the anti-glare device 100 in place.

Figure 4:
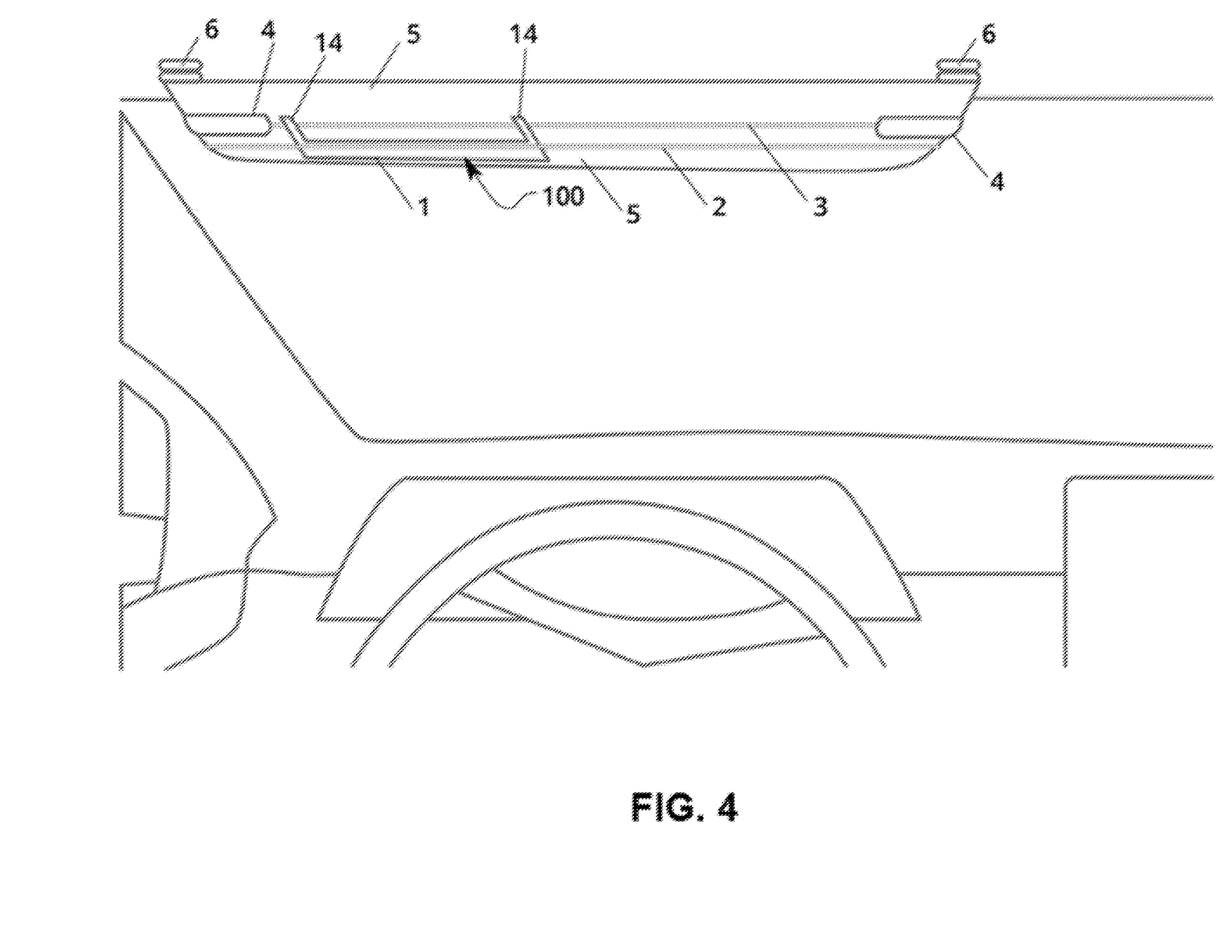
FIG. 4 is a perspective view illustrating the second embodiment of the anti-glare device, wherein the anti-glare panel is secured in an inactive position by the secondary elastic member.

FIG. 4 illustrates an example of the second embodiment of the anti-glare device 100 comprising the U-shaped clips 4, wherein the anti-glare panel 1 is secured in an inactive position by the secondary elastic member 2.

Figure 5:
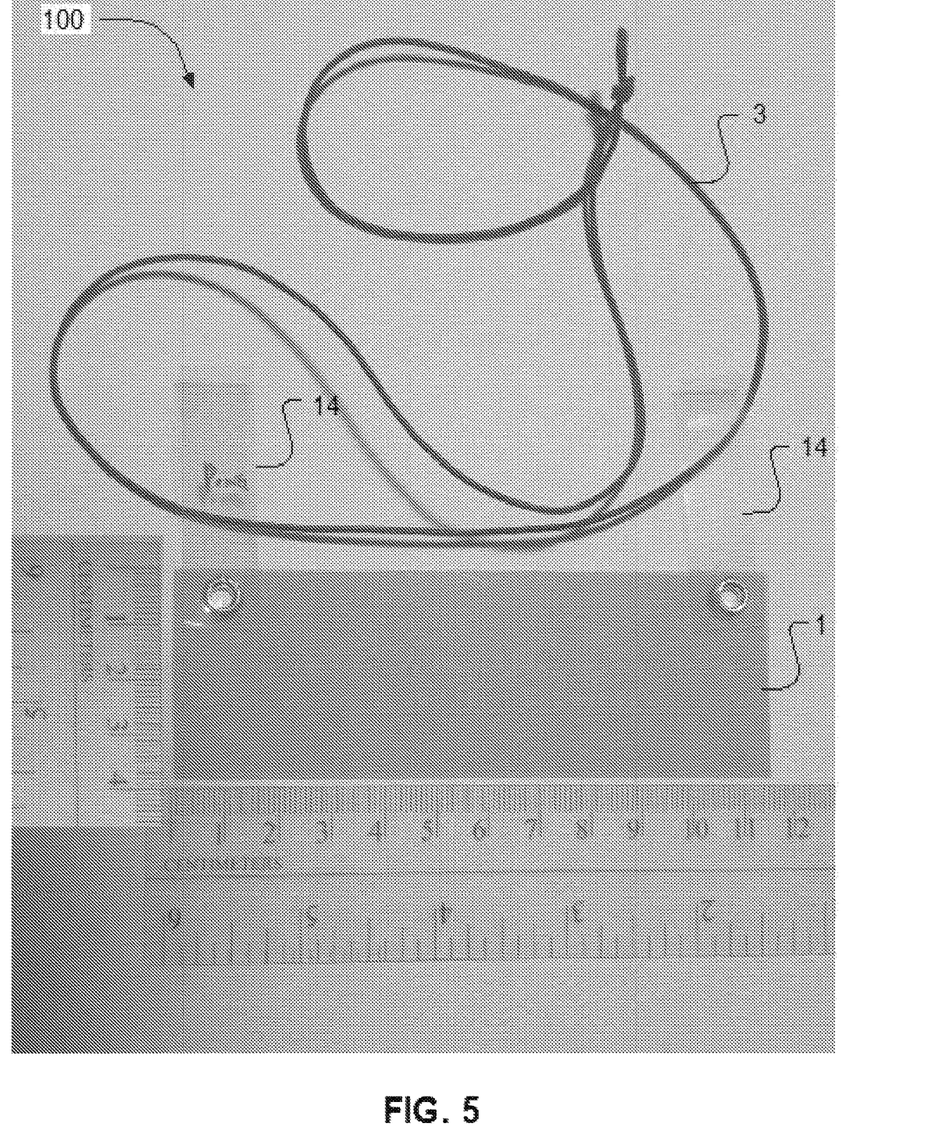
FIG. 5 is an image of the first embodiment of the anti-glare device.

FIG. 5 is an image of the first embodiment of the anti-glare device 100. In the image, the device is not installed. Depicted are the anti-glare panel 1, the attachment arms 14 and the primary elastic member 3.

Figure 6:
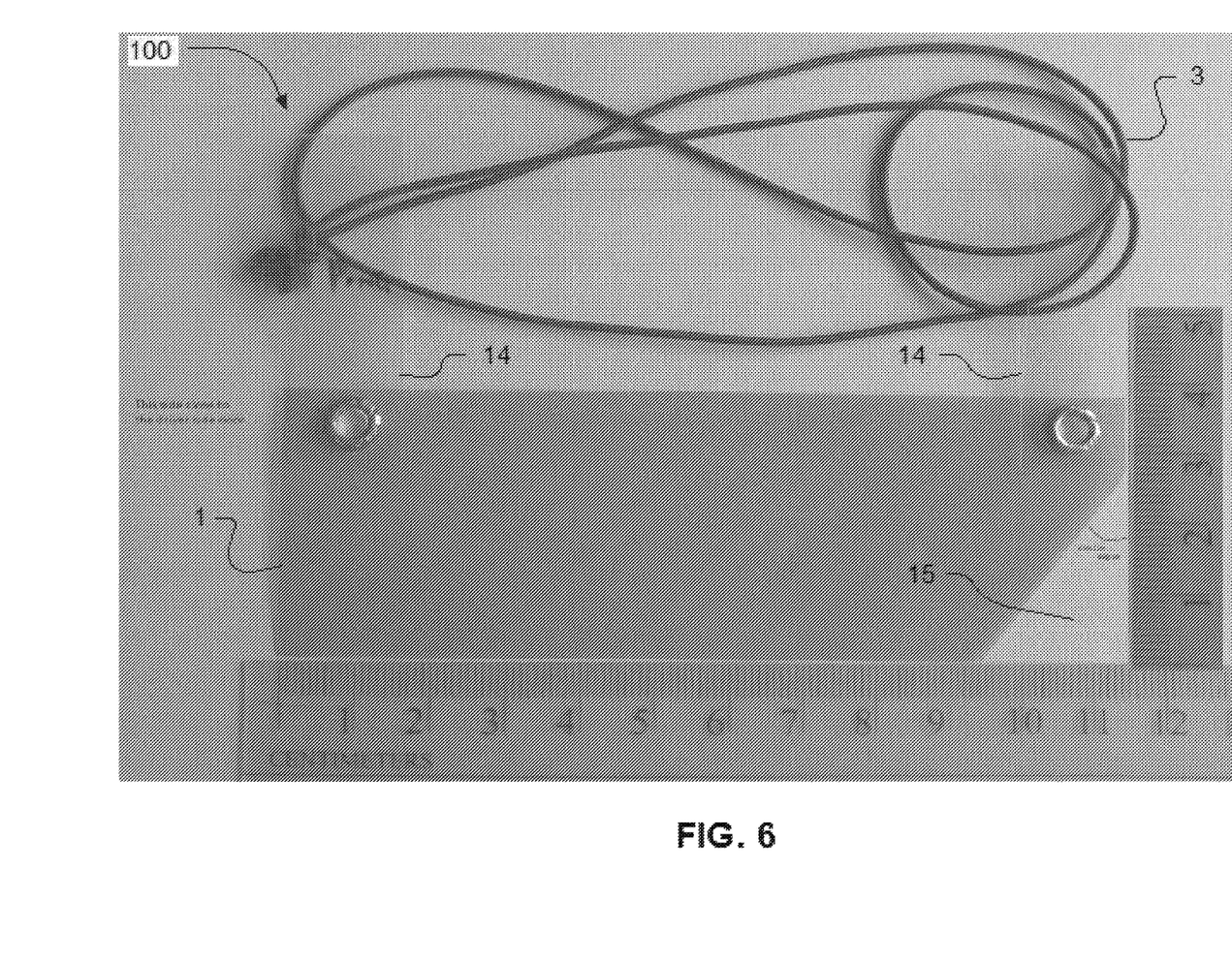
FIG. 6 is an image of a third embodiment of the anti-glare device.

FIG. 6 is an image of a third embodiment of the anti-glare device 100. In the depicted embodiment, the horizontal length of the anti-glare panel 1 decreases over the vertical width of the anti-glare panel 1, forming a recess 15 at the bottom right corner of the panel. Now the anti-glare panel 1 can be positioned such that light from the center of the road does not pass through the anti-glare panel 1 and thus reaches the driver's eye without being filtered or attenuated. In this way, the recess 15 allows for natural visibility of the center line and/or lane markings of the road by not obscuring or reducing the intensity of light coming from the region of the driver's visual field most likely to contain the center line and/or lane markings.

Figure 7:
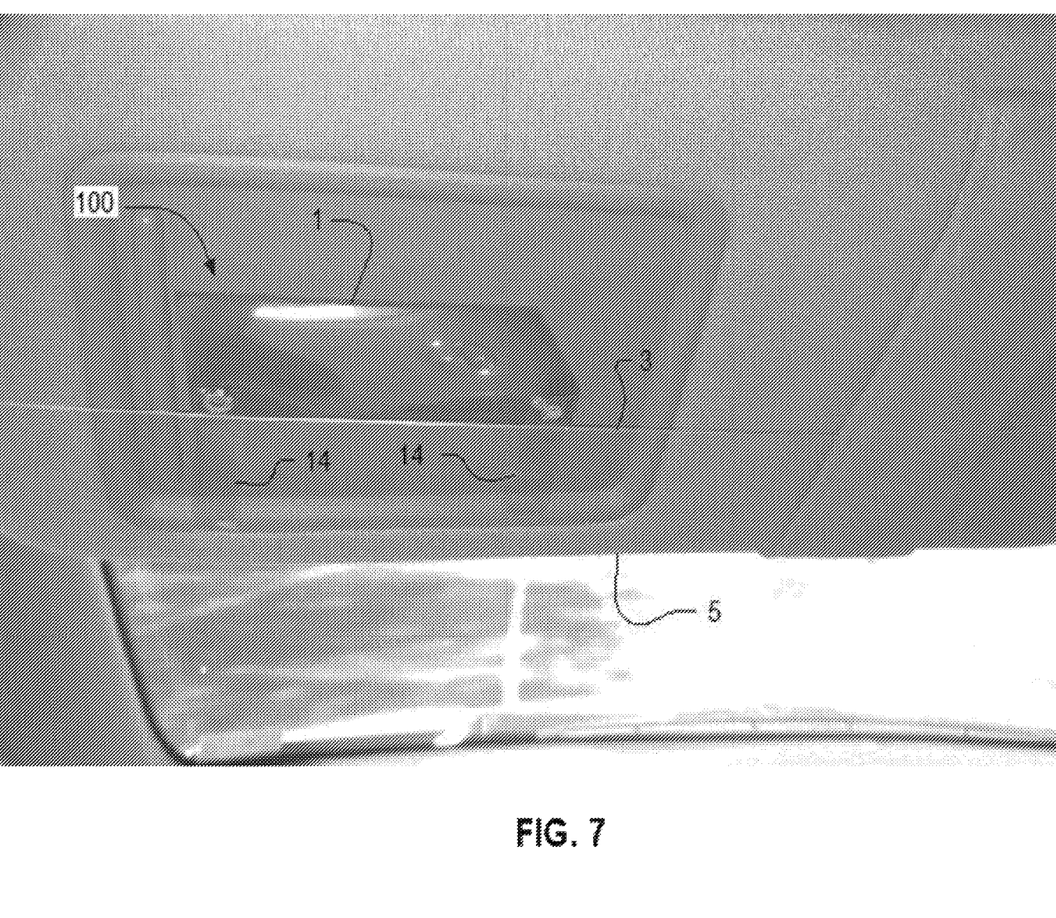
FIG. 7 is an image of the first embodiment of the anti-glare device attached to a sun visor.

FIG. 7 is an image of a fourth embodiment of the anti-glare device 100. Depicted are the anti-glare panel 1, the attachment arms 14 and the primary elastic member 3. In the image, the device is installed on the sun visor 5, and the primary elastic member 3 secures the anti-glare panel 1 in an inactive position instead of the secondary elastic member 2.

Figure 8:
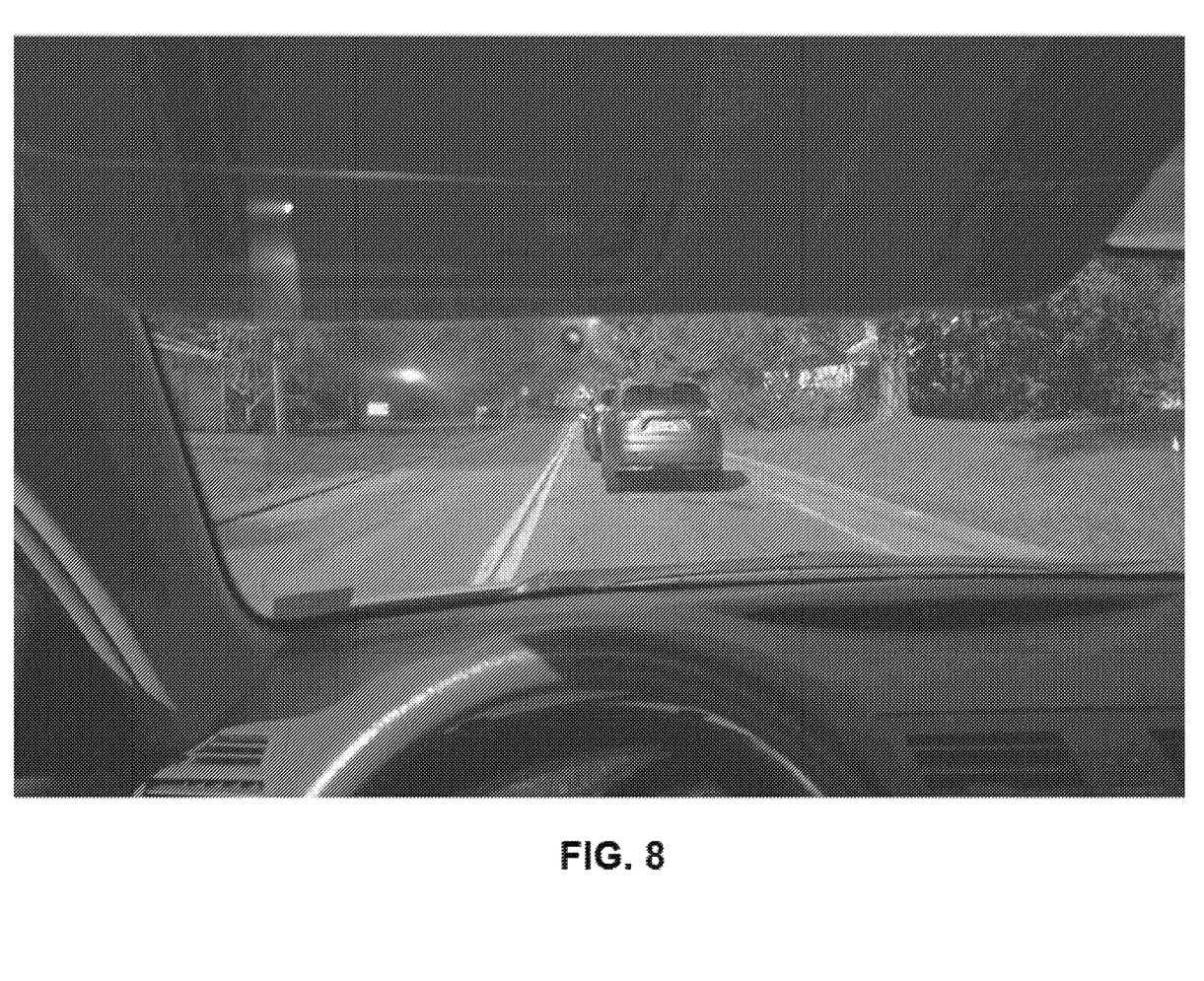
FIG. 8 is an image of the first embodiment of the anti-glare device attached to a sun visor.

FIG. 8 is another image of the first embodiment of the anti-glare device 100. In the image, the device is installed on the sun visor 5, and the anti-glare panel 1 hangs in an active position.

As described above, the anti-glare device 100 only includes the light and flexible anti-glare panel 1, and the two elastic members 3, 2 (and optionally, two U-shaped clips), all of which are very compact. This makes the anti-glare device 100 very economical to manufacture. In addition, because most, if not all, of the materials are light and flexible, the said anti-glare device 100 is very safe to be used in automobiles in the event of an accident or sudden stop, among other examples.

Further alternative embodiments include a thin compartment attached to the sun visor 5, wherein the anti-glare panel 1 can be pulled up and down into and out of the compartment. In another alternative embodiment, said compartment is included as a part of the sun visor 5.

While this invention has been particularly shown and described with references to preferred embodiments thereof, it will be understood by those skilled in the art that various changes in form and details may be made therein without departing from the scope of the invention encompassed by the appended claims.

What is claimed is:

1. A device for reducing night time road glare in an automobile, the device comprising:
   an anti-glare panel for filtering incoming light, wherein the anti-glare panel is a sheet of flexible, tinted, transparent material and sized just to block headlight glare from approaching automobiles, wherein the anti-glare panel is horizontally movable to a sightline of the driver; and
   an attachment mechanism for attaching the anti-glare panel to a sun visor of the automobile, wherein the attachment mechanism includes at least two hanging loops integrated with the anti-glare panel and a first elastic member, the first elastic member goes through the two hanging loops to secure the anti-glare panel in place and forms a loop encircling the sun visor, the two hanging loops are spaced apart and create an elongated gap between the sun visor and the anti-glare panel while holding the anti-glare panel in an active position when the device is being used, the gap allows a driver of the automobile to look through and up for signs ahead above the automobile.

2. The device as claimed in claim 1, wherein the anti-glare panel has a horizontal length between 50 and 300 millimeters and a vertical width between 20 and 100 millimeters.

3. The device as claimed in claim 1, wherein the attachment mechanism further includes a second elastic member forming a loop, stretched and being compressed removably onto the sun visor of the automobile by encircling the sun visor, the second elastic member holds the anti-glare panel in an inactive position when the device is not being used.

4. The device as claimed in claim 1, wherein the anti-glare panel is movable horizontally along the loop by moving the two hanging loops.

5. The device as claimed in claim 1, wherein the attachment mechanism further comprises an additional elastic member for holding the anti-glare panel in an inactive position when the device is not being used.

6. The device as claimed in claim 1, wherein the two hanging loops are transparent to allow the driver to see through.

7. The device as claimed in claim 1, wherein the horizontal width of the anti-glare panel decreases over the vertical length of the anti-glare panel, forming a recess at a bottom corner of the anti-glare panel for allowing natural visibility of a center line and/or lane markings of the road.

8. A method for reducing night time road glare in an automobile, the method comprising:

attaching an anti-glare panel to a sun visor via an attachment mechanism comprising an elastic member and at least two hanging loops integrated with the anti-glare panel, wherein the elastic member goes through the two hanging loops and forms a loop;

encircling the loop around the sun visor to secure the anti-glare panel in place, wherein the two hanging loops are spaced apart and create an elongated gap between the sun visor and the anti-glare panel while holding the anti-glare panel in an active position while the device is being used, the gap allows a driver of the automobile to look through and up for signs ahead above the automobile; and moving the anti-glare panel horizontally along the elastic member into a sightline of the driver to filter out oncoming headlights, wherein the anti-glare panel is a sheet of flexible, tinted and transparent material.

9. The method as claimed in claim 8, wherein the attachment mechanism further comprises an additional elastic member for holding the anti-glare panel in an inactive position when the device is not being used.

10. The method as claimed in claim 8, wherein said moving the anti-glare panel horizontally along the elastic member into a sightline of the driver to filter out oncoming headlights comprises: sliding the anti-glare panel to make lateral adjustment thereof to a different sightline.

11. The method as claimed in claim 8, wherein the horizontal width of the anti-glare panel decreases over the vertical length of the anti-glare panel, forming a recess at a bottom corner of the anti-glare panel for allowing natural visibility of a center line and/or lane markings of the road.

12. The method as claimed in claim 8, wherein the anti-glare panel is tinted with an amber color.

13. The method as claimed in claim 8, wherein the material of the anti-glare panel is polyvinyl chloride (PVC).

14. The method as claimed in claim 8, wherein the anti-glare panel has a horizontal length between 50 and 300 millimeters, a vertical width between 20 and 100 millimeters, and a thickness of between 5 and 10 mil.

* * * * *